United States Patent
Kim et al.

(10) Patent No.: US 6,664,123 B2
(45) Date of Patent: Dec. 16, 2003

(54) METHOD FOR ETCHING METAL LAYER ON A SCALE OF NANOMETERS

(75) Inventors: Byong-man Kim, Gunpo (KR); Soo-doo Chae, Seoul (KR); Hee-soon Chae, Cheongju (KR); Won-il Ryu, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/029,814

(22) Filed: Dec. 28, 2001

(65) Prior Publication Data

US 2002/0168825 A1 Nov. 14, 2002

(30) Foreign Application Priority Data

May 14, 2001 (KR) .......................... 2001-26210

(51) Int. Cl.[7] .................. H01L 21/00; H01L 21/326; H01L 21/479; H01L 21/3205; H01L 21/4763
(52) U.S. Cl. .................. 438/20; 438/466; 438/586
(58) Field of Search .................. 438/20, 466, 586

(56) References Cited

U.S. PATENT DOCUMENTS

| 4,971,851 | A | * | 11/1990 | Neukermans et al. | 428/137 |
| 5,580,467 | A | * | 12/1996 | Kim | 216/11 |
| 5,892,223 | A | * | 4/1999 | Karpov et al. | 250/306 |

* cited by examiner

*Primary Examiner*—Olik Chaudhuri
*Assistant Examiner*—William M. Brewster
(74) *Attorney, Agent, or Firm*—Lee & Sterba, P.C.

(57) ABSTRACT

A method for etching a metal layer on a scale of nano meters, includes preparing a substrate on which a metal layer is formed, positioning a micro tip over the metal layer, generating an electron beam from the micro tip by applying a predetermined voltage between the metal layer and the micro tip, and etching the surface of the metal layer into a predetermined pattern with the electron beam. Accordingly, it is possible to form an etched pattern by applying a negative bias to a micro tip without applying a strong mechanical force to the micro tip, and heating/melting the metal layer with the use of an electron beam emitted from the micro tip which is negative-biased.

9 Claims, 6 Drawing Sheets

METHOD FOR ETCHING METAL LAYER ON A SCALE OF NANOMETERS

BACKGROUND OF THE INVENTION

1. Field of the Invention

The present invention relates to a method for etching a metal layer on a scale of nano meters, and more particularly, to a method for etching a metal layer on a scale of nano meters by controlling bias voltage at a voltage-biased micro tip.

2. Description of the Related Art

In a conventional nano-scale etching method using a micro tip, a strong mechanical load is applied to the micro tip so that the micro tip digs into underlying material. However, in the conventional nano-scale etching method, it is difficult to etch material into a desired shape or size and control the etching speed. The conventional nano-scale etching method using a mechanical load force is usually applied to a data storage technique.

There are other data storage techniques including a method of polarizing a ferroelectric material, a method of thermally transforming polymer, a method of transforming the phase of a magnetic material, a method of transforming the phase of a resistant material, and a method of transforming the phase of metal or semiconductor through oxidation. However, each one of these techniques have a few disadvantages in view of data recording time and data storage.

SUMMARY OF THE INVENTION

To solve the above-described problems, it is a feature of the present invention to provide a method for etching a metal layer on a scale of nano meters which is capable of freely controlling the shape and size of a pattern to be etched and the etching speed on a scale of nano meters with the use of a voltage-biased micro tip.

Accordingly, to achieve the above feature, there is provided a method for etching a metal layer on a scale of nano meters. The method includes preparing a substrate on which a metal layer is formed, positioning a micro tip over the metal layer, generating an electron beam from the micro tip by applying a predetermined voltage between the metal layer and the micro tip, and etching the surface of the metal layer into a predetermined pattern with the electron beam.

Preferably, the micro tip is moved relative to the metal layer during the etching of the metal layer. Preferably, the predetermined voltage is varied within a particular range of voltage and is used to control the degree to which the metal layer is etched.

Preferably, the substrate is a silicon substrate, the surface of which is formed of a silicon oxide layer, and the metal layer is formed of gold (Au) on the top surface of the silicon oxide layer.

Preferably, the predetermined voltage is between 12 volts and 25 volts, and the micro tip is negative-biased. Preferably, the micro tip is formed of silicon (Si) and the surface of the micro tip is coated with a titanium film.

Preferably, a load of <100 nN is applied to the micro tip along with a predetermined voltage between the metal layer and the micro tip.

The etching method of this invention is used for making a data storage device.

These and other features of the present invention will be readily apparent to those of ordinary skill in the art upon review of the detailed description that follows.

BRIEF DESCRIPTION OF THE DRAWINGS

The above features and advantages of the present invention will become more apparent by describing in detail a preferred embodiment thereof with reference to the attached drawings in which.

DETAILED DESCRIPTION OF THE INVENTION

Korean Patent Application No. 2001-26210, filed on May 14, 2001, and entitled: "Method for etching metal layer on a scale of nano meters," is incorporated by reference herein in its entirety.

The present invention will now be described more fully with reference to the accompanying drawings in which a preferred embodiment of the invention is shown.

Figure 1:
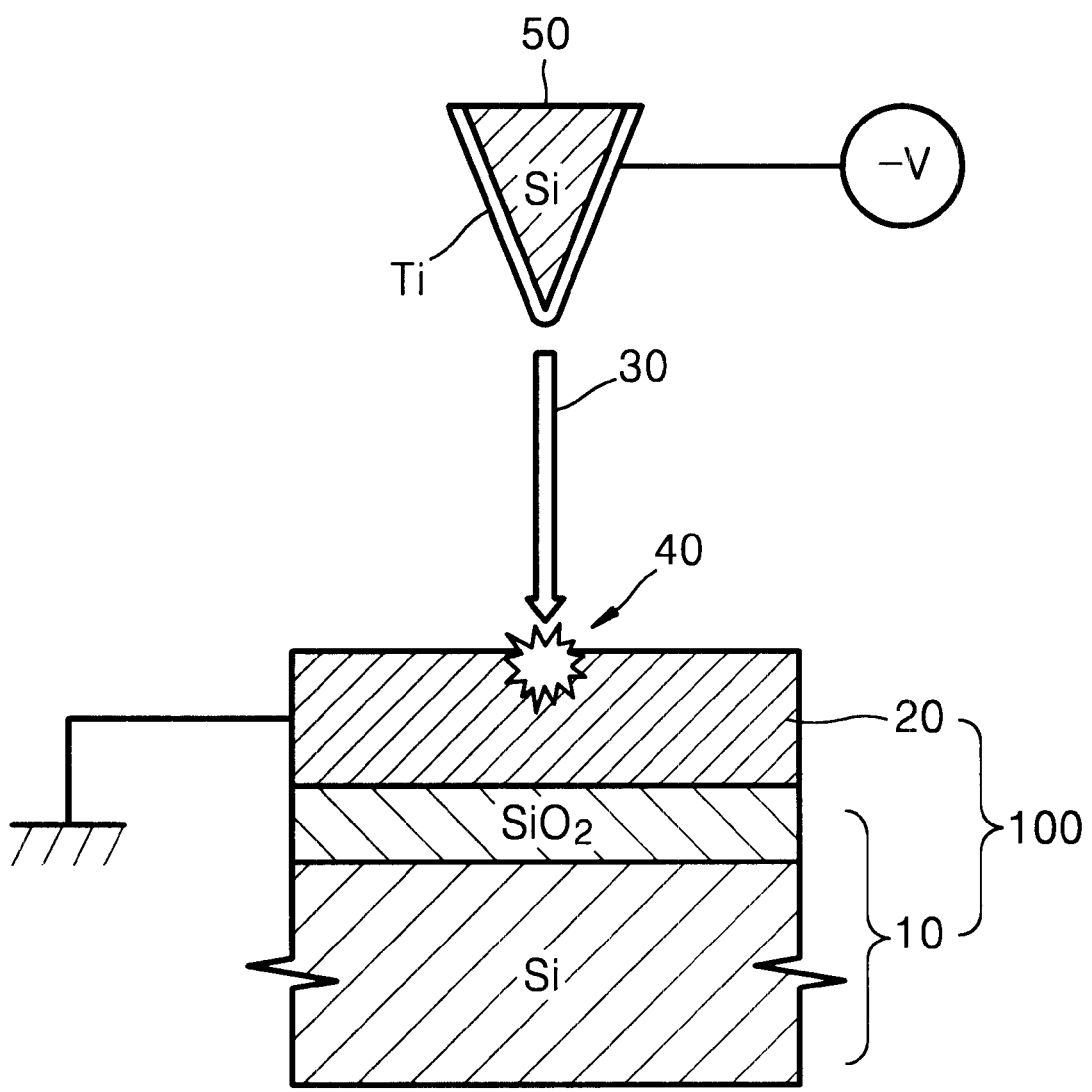
FIG. 1 is a cross-sectional view illustrating the principles of a method for etching a metal layer according to the present invention.

FIG. 1 is a cross-sectional view illustrating the principles of a method for etching a metal layer according to the present invention. As shown in FIG. 1, an Au/SiO$_2$/Si recording plate 100, which is formed by depositing a metal layer 20 that is formed of Au on a SiO$_2$/Si substrate 10, is prepared. A micro tip 50, preferably made of silicon, is positioned over the recording plate 100, and the surface of the micro tip 50 is coated with a titanium layer. A predetermined voltage is applied between the micro tip 50 and the recording plate 100 so that the micro tip 50 is negative-biased. If the predetermined voltage is applied, an electron beam 30 is generated from the micro tip 50 and reaches the metal layer 20, and thus the metal layer 20 is partially heated/melted by the electron beam 30.

If the level of bias voltage applied between the recording plate 100 and the micro tip 50 is varied within a predetermined range of voltage, the etched state (degree of etching) of the metal layer 20, that is, the size (area, depth, and width) of a metal layer pattern formed by etching with the electron beam 30 becomes varied. In other words, it is possible to control the size of a metal layer pattern as desired by controlling the bias voltage applied between the recording plate 100 and the micro tip 50. Accordingly, it is possible to reproduce data from a recording plate by reading etched patterns, which are formed on the recording plate using the method described above.

As shown in FIG. 1, a bias voltage, which exceeds a predetermined voltage level within a range of 12–25 volts, is applied between the micro tip 50 attached to a Ti/Si cantilever (not shown) and the metal layer 20 so that the micro tip 50 is negative-biased. Then, the micro tip 50 is moved (relative to the metal layer) over a predetermined portion of the metal layer 20 along with the Ti/Si cantilever so that the predetermined portion of the metal layer 20 is etched. This process corresponds to a "write" process or lithography in data storage. Data can be read by detecting the difference in morphology, physical properties, or electrical characteristics between portions of the metal layer 20 transformed by etching and other portions of the metal layer 20 not transformed by etching or by emitting a laser beam onto the surface of the metal layer 20 subjected to etching and detecting the difference in refractive indexes between portions of the metal layer 20 transformed by etching and other portions of the metal layer 20 not transformed by etching. This process corresponds to a "read" process.

Specifically, there are various methods of reading data taking advantage of the difference in physical properties, such as shape, capacitance, resistance, frictional coefficient, or optical refractive index, between portions of the metal layer 20 etched by voltage applied between the recording plate 100 and the micro tip 50 and other non-etched portions of the metal layer 20.

As shown in FIG. 1, the recording plate, which is formed by depositing a metal layer 20 on a $SiO_2$/Si substrate 10, is prepared. The micro tip 50, which is coated with titanium and is fixed to a cantilever (not shown), is positioned over the recording plate 100. Then, a predetermined voltage is applied between the metal layer 20 of the recording plate 100 and the micro tip 50 so that electrons are emitted from the micro tip 50. Then the electrons generate current-induced resistive heat on the metal layer 20. The metal layer 20 is partially melted by the resistive heat, and a partially etched portion 40 is formed in the metal layer 20. In order to read data recorded or etched on the recording plate 100, as described above, the difference in morphology between etched portions of the metal layer 20 and other non-etched portions of the metal layer 20 is detected.

Figure 2:
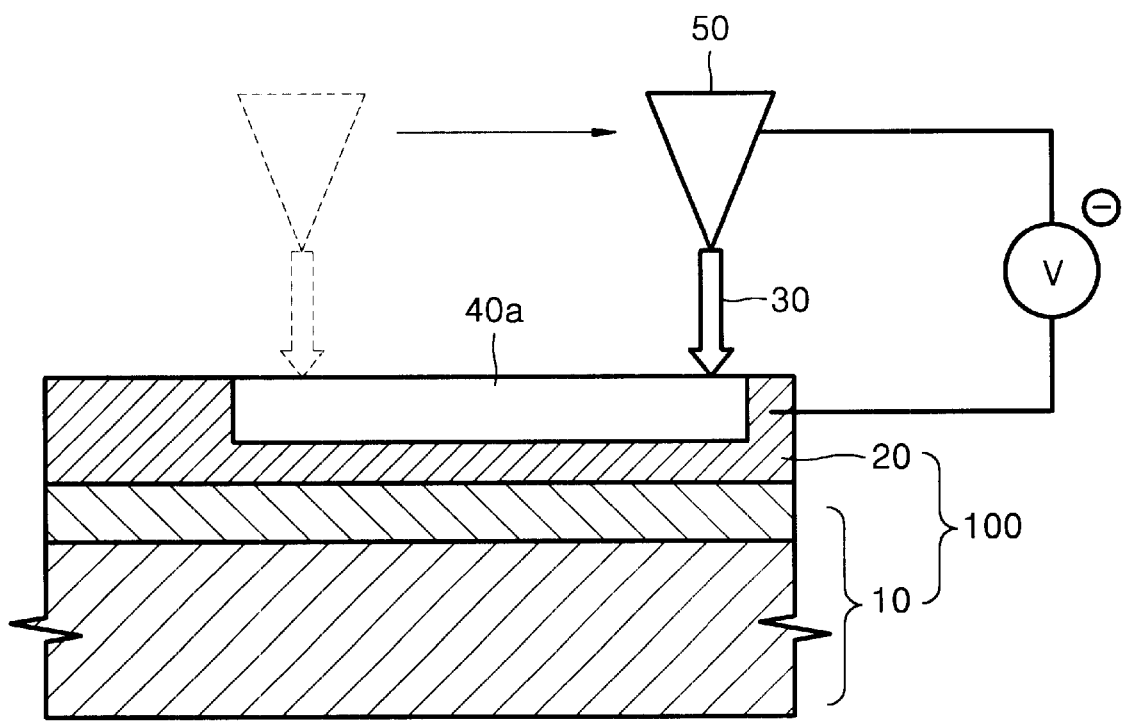
FIG. 2 is a diagram illustrating a method for forming an etching line by the method for etching a metal layer according to the present invention shown in FIG. 1.

FIG. 2 is a cross-sectional view illustrating a process for forming a groove 40a by etching the metal layer 20 with the use of the micro tip 50 while inducing the micro tip 50 to move over the recording plate 100. If the micro tip 50 is moved over the metal layer 20 under a condition in which a predetermined voltage is applied between the micro tip 50 and the metal layer 20, the groove 40a is formed by the electron beam 30 generated from the micro tip 50. If the voltage applied between the micro tip 50 and the metal layer 20 is appropriately controlled during movement of the micro tip 50 over the metal layer 20, the amount to which the metal layer 20 in the groove 40a is etched may be varied.

Figure 3A:
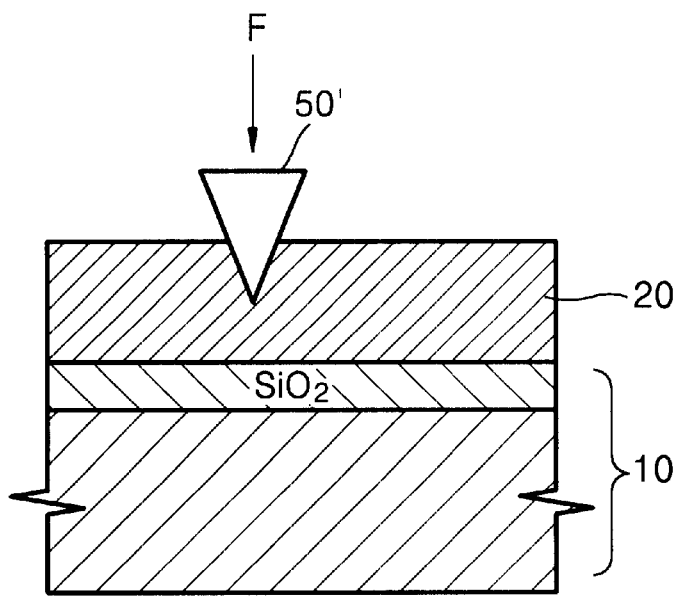
FIG. 3A is a diagram illustrating the principles of a conventional method for etching a metal layer.
Figure 3B:
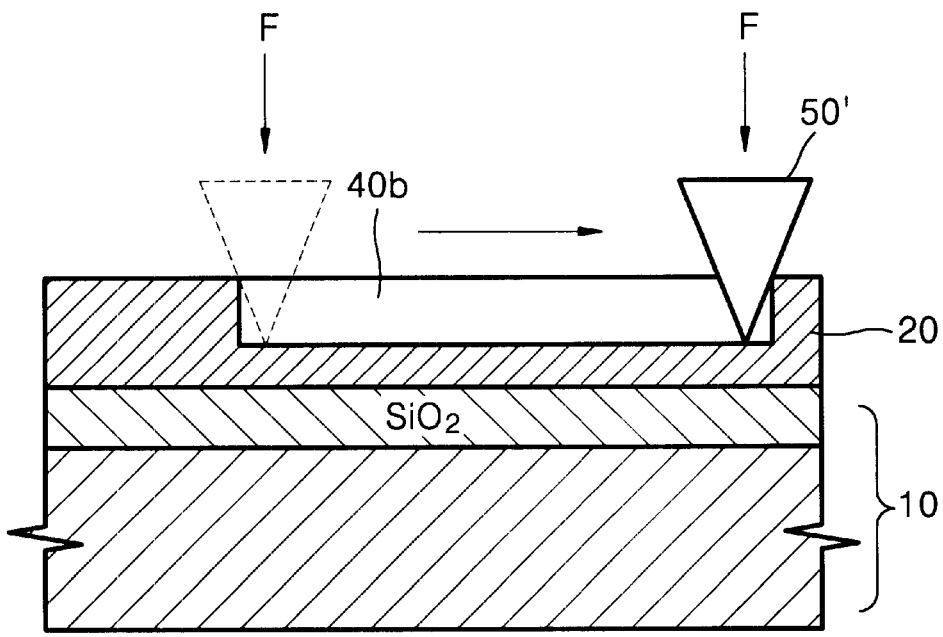
FIG. 3B is a diagram illustrating a method for forming an etching line by the conventional method for etching a metal layer shown in FIG. 3A.

FIGS. 3A and 3B are cross-sectional views illustrating a conventional mechanical etching method compared with the etching method of the present invention. As shown in FIG. 3A, in the conventional etching method, pressure F is applied to a micro tip 50' to make the micro tip 50' directly damage a metal layer 20. Then, as shown in FIG. 3B, the micro tip 50' is moved relative to the metal layer 20, thereby forming a groove 40b scribed by the micro tip 50'.

Figure 4A:
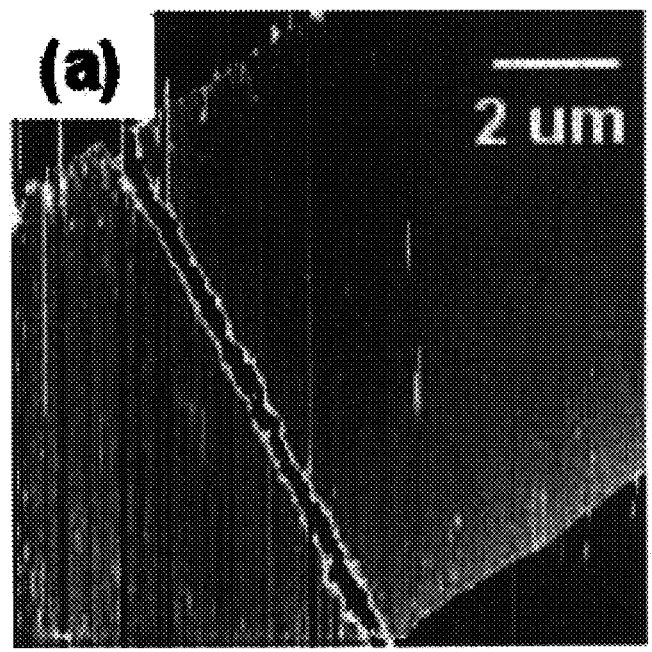
FIG. 4A is an atomic force microscopic (AFM) image showing an etched pattern formed using a method for etching a metal layer according to the present invention.
Figure 4B:
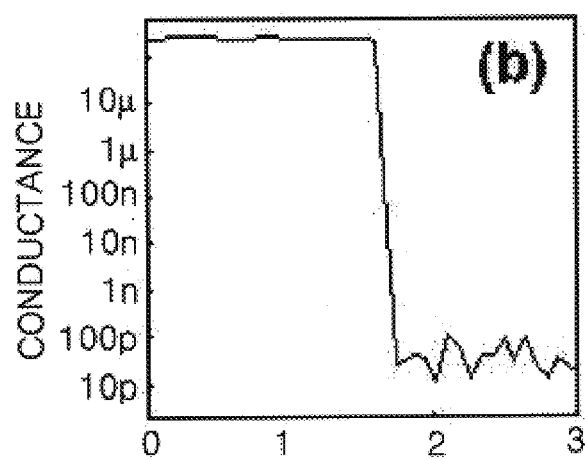
FIG. 4B is a graph illustrating the results of electrical measurement during the formation of the etched pattern shown in FIG. 4A.

FIG. 4A is an AFM image showing an etched line or groove formed on a metal layer by applying a load of about 10 nN and a negative bias of –19 volts to a micro tip. In the present invention, the applied load to the micro tip is <100 nN along with a negative bias on the micro tip. When reading the etched line or groove, only a load of about 10 nN is applied to the micro tip without application of a negative voltage of –19 volts. The metal layer is not damaged or etched under the above conditions of the reading of the etched line or groove. FIG. 4B is a graph illustrating the results of electrical measurement during the formation of the etched line shown in FIG. 4A. In FIG. 4B, the degree to which the graph showing the conductance (the Y-axis) with respect to time (the X-axis) is slanted represents the rate at which an Au layer is partially etched. As shown in FIGS. 4A and 4B, the width of the etched line is about several nano meters, and the etched line is formed in several nano seconds. Accordingly, the etching method of the present invention can be easily applied to a data storage device of several hundreds of giga bytes or greater.

Figure 5A:
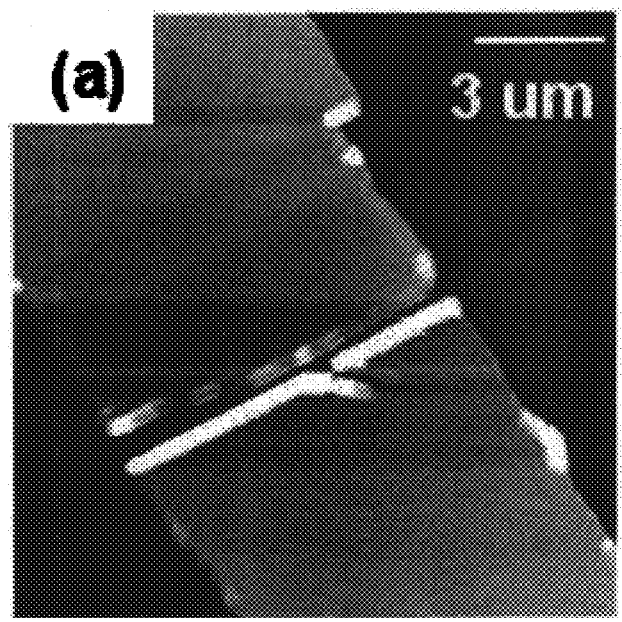
FIG. 5A is an AFM image showing an etched pattern formed using a conventional method for etching a metal layer.
Figure 5B:
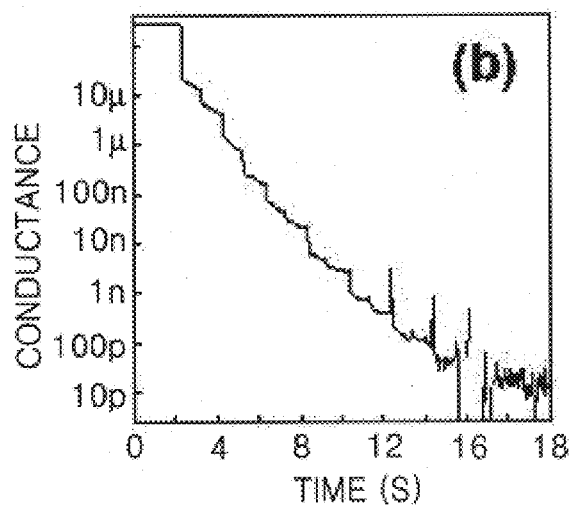
FIG. 5B is a graph illustrating the results of electrical measurement during the formation of the etched pattern shown in FIG. 5A.

FIG. 5A is an AFM image showing an etched line formed on a metal layer by applying a physical force of about 1 $\mu$N or greater to a micro tip under a condition in which voltage is not applied to the micro tip, like in the conventional etching method shown in FIGS. 3A and 3B. FIG. 5B is a graph illustrating the results of electrical measurements during a conventional etching method shown in FIG. 5A, wherein the Y-axis represents conductance and the X-axis represents time. As shown in FIGS. 4B and 5B, the etching method of the present invention is capable of forming an etched line much faster and more precisely than the conventional etching method.

Figure 6:
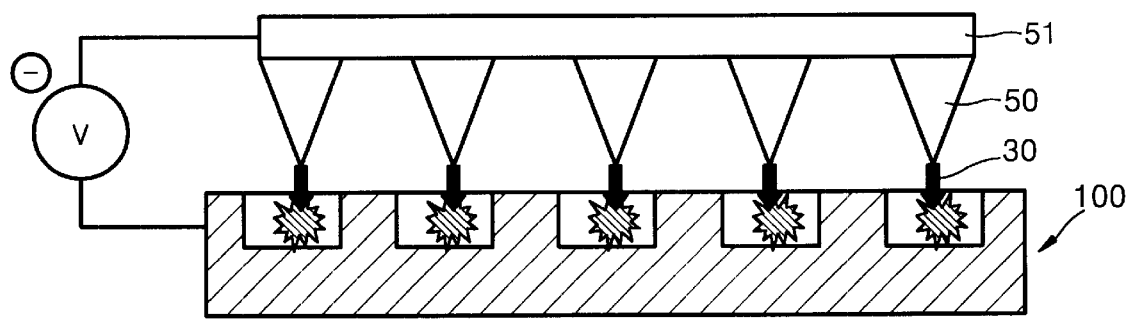
FIG. 6 is a diagram illustrating the basic structure of a data storage device having a large storage capacity, to which a method for etching a metal layer according to the present invention is applied.

FIG. 6 is a cross-sectional view illustrating the basic structure of a data storage (or lithography) device having a large storage capacity, to which a method for etching a metal layer according to the present invention is applied. As shown in FIG. 6, a plurality of micro tips 50, which are negative-biased with respect to a recording plate, are arrayed on a structure 51, thereby realizing a data storage having a large storage capacity.

As described above, the method for etching a metal layer on a scale of nano meters according to the present invention is capable of forming an etched pattern by applying a negative bias to a micro tip without applying a strong mechanical force to the micro tip, and heating/melting the metal layer with the use of an electron beam emitted from the micro tip which is negative-biased. Accordingly, it is easy to control the size of the etched pattern which represents data. In addition, since the etching speed of the etching method of the present invention is many times faster than the prior art, the etching method of the present invention can be applied to a data storage of several hundreds of giga bytes or greater and nano-lithography with a large storage capacity.

A preferred embodiment of the present invention has been disclosed herein and, although specific terms are employed, they are used in a generic and descriptive sense only and not for purpose of limitation. Accordingly, it will be understood by those of ordinary skill in the art that various changes in form and details may be made without departing from the spirit and scope of the invention as se forth in the following claims.

What is claimed is:

1. A method for etching a metal layer on a scale of nano meters comprising:

preparing a substrate on which a metal layer is formed;

positioning a micro tip over the metal layer;

generating an electron beam from the micro tip by applying a predetermined voltage between the metal layer and the micro tip; and etching the surface of the metal layer into a predetermined pattern with the electron beam.

2. A method for etching a metal layer on a scale of nano meters comprising:

preparing a substrate on which a metal layer is formed;

positioning a micro tip over the metal layer;

generating an electron beam from the micro tip by applying a predetermined voltage between the metal layer and the micro tip; and etching the surface of the metal layer into a predetermined pattern with the electron beam, wherein the micro tip is moved relative to the metal layer during the etching.

3. The method of claim 2, wherein the predetermined voltage is varied within a particular range of voltage and is used to control the degree to which the metal layer is etched.

4. The method of claim 1, wherein the substrate is a silicon substrate, the surface of which is formed of a silicon oxide layer, and the metal layer is formed of gold (Au) on the top surface of the silicon oxide layer.

5. The method of claim 1, wherein the predetermined voltage is between 12 volts and 25 volts, and the micro tip is negative-biased.

6. The method of claim 4, wherein the predetermined voltage is between 12 volts and 25 volts, and the micro tip is negative-biased.

7. The method of claim 1, wherein the micro tip is formed of silicon (Si) and the surface of the micro tip is coated with a titanium film.

8. The method of claim 1, wherein a load of <100 nN is applied to the micro tip along with a predetermined voltage between the metal layer and the micro tip.

9. The method of claim 1, wherein the etching is used for making a data storage device.

* * * * *